Dec. 20, 1938.  R. KAPLAN  2,140,749
CAPPED NAIL
Filed Aug. 5, 1936
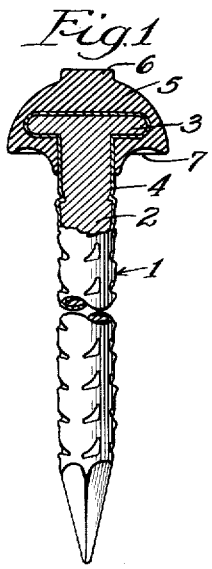
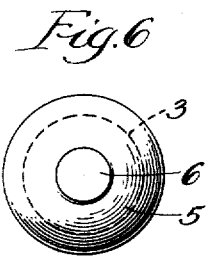
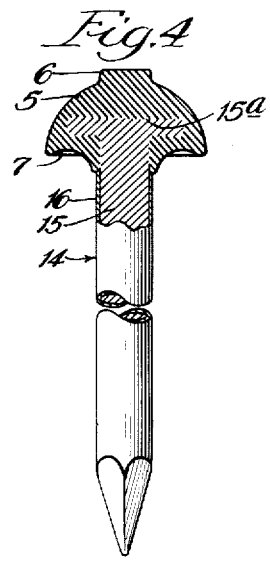
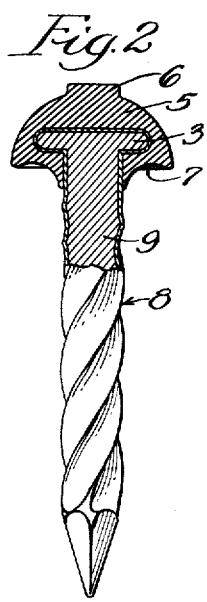
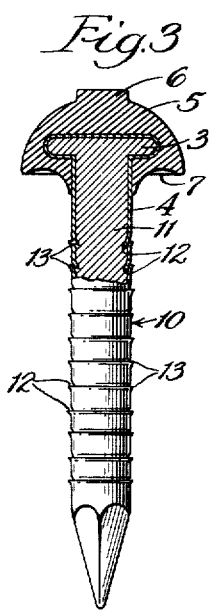
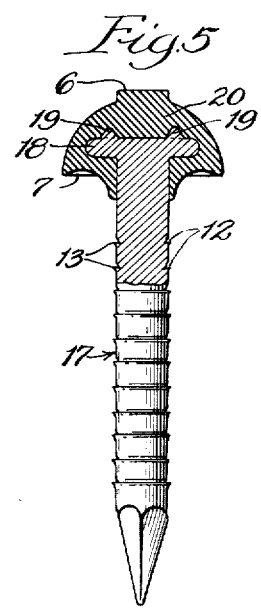
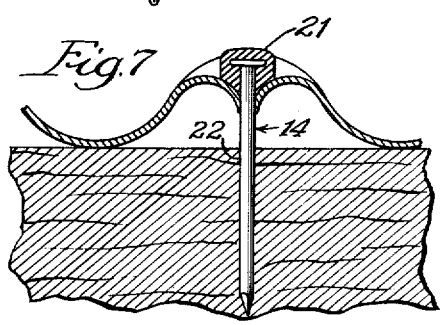
Inventor:
Robert Kaplan,
By Louis Sheldon
Atty.

Patented Dec. 20, 1938

2,140,749

UNITED STATES PATENT OFFICE 2,140,749

CAPPED NAIL

Robert Kaplan, Chicago, Ill., assignor to Filshie Lead Head Nail Company, Inc., Chicago, Ill., a corporation of Illinois Application August 5, 1936, Serial No. 94,303

11 Claims. (Cl. 85—28)

This invention relates to capped nails and other fasteners for roofing and other purposes.

It is an object of the invention to provide an improved process for securely fastening a cap to a nail.

Another object of the invention is to integrally unite a cap to a nail.

It is a further object of the invention to provide an improved capped nail in which the cap and nail are securely united.

A still further object of the invention resides in the provision of a capped nail in which the cap is adhesively secured to the nail.

A still further object of the invention is to provide a capped nail in which the cap and nail are integrally united.

A still further object of the invention is to provide a capped nail in which the cap and nail are bonded together.

It is another object of the invention to provide a capped nail whose shank is adhesively embedded in the fastened material so as to resist separation of the cap from the material engaged thereby.

It is another object of the invention to provide a capped screw-nail whose shank is adhesively embedded in the fastened material so as to resist separation of the cap from the material engaged thereby.

In accordance with the general features of the invention, a fastener such as a nail whose shank may be plain or roughened is provided with a coat which is normally dry but adapted to become tacky upon becoming heated. After a cap of any suitable material such as lead is applied to the head of a coated nail, and sufficient heat to impart tackiness to the adjacent coat is provided, the cooling of the coat causes the cap to be securely adhesively joined to the nail. The coating may include a constituent having flux characteristics for soldering or welding purposes. In such event, where a fusible cap, such as lead for example, is applied so that the portion thereof contiguous to the nail is in a molten state, the coating will soften and the flux constituent thereof will permit the cap to be soldered or bonded to the nail.

In accordance with another form of the invention, a nail is provided with a series of annular ledges facing the nail head so as to catch under the fastened material and be prevented thereby from withdrawing therefrom. The cap may be secured in a variety of ways, including casting and pressure, or may be interlocked with the nail to prevent its rotation relative to the nail.

Further objects and advantages of the invention will appear as the description proceeds.

Figures 1, 2, and 3 show the invention in connection with barbed, screw and transversely fluted nail shanks.

Figure 4 is a section-elevation of another form of the invention, shown in connection with a smooth nail shank.

Figure 5 shows another form of the invention, including a transversely fluted nail shank.

Figure 6 is a top plan view of a cap such as appears in previous figures.

Figure 7 shows one of the fasteners in use.

In Figure 1 is illustrated a coated nail indicated at 1, and comprising a barbed shank 2, a head 3, and a coat 4 which it will be observed covers the head as well as the shank. This coat is preferably dry at atmospheric temperatures, but it becomes tacky when subjected to abnormal heat. A cap 5 encloses the head and the adjacent portion of the shank. The cap may be cast on to the nail, or it may be applied with the use of dies and pressure, or otherwise. However it may be applied, the contiguous portion of the coat 4 is sufficiently heated to become tacky, thereby serving as an adhesive. When the materials have again cooled, the cap is adhesively firmly secured to the nail. If desired, the coat could be applied only to the head and adjacent shank portion of the nail, and the cap material applied either before or after the coat becomes dry.

The coat on the shank becomes tacky from the heat developed in the operation of driving the nail into the wood or other fastened material, and upon drying tightly holds the nail in the said material. This substantially prevents "breathing" or creeping of the cap relative to the fastened material engaged thereby. This is a fault of capped nails hitherto used in roofing construction, for example, where, due to loosening of the shank, or the cap relative to the head, the seal between the cap and the roofing material engaged thereby becomes broken admitting moisture and other foreign elements having deleterious effects.

The cap 5 may be of any suitable shape, that illustrated being shown by way of example only. It may be provided with a knob 6 to assist in aligning the driving stresses with the axis and afford sufficient protection for the nail head. The underside 7 of the cap 5 is preferably formed to snugly and intimately engage the roofing or other material to be fastened.

Figures 2 and 3 differ from Figure 1 essentially in the character of the shanks thereof.

In Figure 2 a screw nail 8 having a screw shank 9 is employed. When this nail is driven it rotates, and the underside 7 of the cap 5 thereof is ground into intimate and sealing engagement with the material fastened thereby. The heat developed during the driving operation softens the coat about the shank sufficiently to adhesively fasten the shank in the material in which it is embedded, so as to prevent the shank from creeping loose. Thus the sealing of the cap is permanently maintained.

The nail shown generally at 10 in Figure 3 has a shank 11 provided with a series of annular grooves 12 which may be formed in any suitable manner as by rolling, to provide ledges 13 facing the head of the nail. The ledges do not project laterally from the normal envelope of the shank sufficiently to offer material obstruction to the driving of the shank into the material to be fastened. The resilience of such material, of which a suitable example is wood, causes the material to spring into the grooves 12 so as to have abutting, interlocking engagement with the ledges. This holding effect exists in addition to the friction between the remaining surface portions of the shank and such material, substantially increasing the holding force of the nail.

The shank 11 may be provided with a coat, such as the coat 4, and a cap 5 whose purposes will be readily evident upon reference to the description above. With this construction, creeping is obviated.

In the form of the invention shown in Figure 4, a nail 14 having any desired character of shank, such as the smooth shank 15, is initially provided with a coat 16. This coat is preferably dry at normal temperatures, and is adapted to become tacky when heated. The coat 16 is a fluxing agent, that is, it will serve as a flux for soldering purposes. Any material having these properties may be used. A solution containing a cellulose derivative, such, for example, as a pyroxylin lacquer containing abietic acid in sufficient quantity to serve as a flux, has been found suitable. A pyroxylin lacquer, containing among other things, about 12 per cent., by weight, of glycol abietate and about 7 per cent., by weight, of high grade pyroxylin, and solvents or thinners, is an example of a satisfactory material for this purpose.

When a cap 5 of lead, or lead alloy, for example, is cast on the nail 14, the heat of the molten cap material melts the portion of the coat on the head and adjacent shank parts of the nail, enabling the flux constituent to function as such, whereupon the cap material becomes soldered to the said head and shank parts. The cap is thus bonded or integrally united, as shown at 15a, with metallic parts of the nail 14. This coating material has the additional function which has been explained above as inherent in the coat 4, relative to the securement of the shank in the material in which it is embedded.

If desired, the coat 16 could be applied to the head alone to enable the cap to be soldered to the nail.

Figure 5 shows a nail 17 whose shank is constructed like the shank 11 in Figure 3, but whose head 18 is provided with one or more eccentric lugs 19. The cap 20 may be applied in any suitable manner so as to be substantially molded to the head and shank parts of the nail 17. It will be observed that the lug or lugs 19 will prevent relative rotation between the cap and the nail.

In Figure 7 a roofing nail embodying the invention is shown driven in place, the cap assuming the shape shown at 21 and the shank being adhesively secured to the wood as at 22.

I am aware that many changes may be made and numerous details of construction may be varied through a wide range without departing from the principles of this invention, and I therefore do not purpose limiting the patent granted hereon otherwise than necessitated by the prior art.

I claim as my invention:

1. A capped nail comprising a shank, a cap of relatively soft metal superimposed thereon, and a coat about the head and shank within and beyond said cap, said coat being adhesive and securing the cap to the head, and being transparent about the shank to reveal the nature of the surface of the shank, said coat being dry at atmospheric temperatures and adapted to be softened to a tacky state by the heat developed between said coat and the material in which it is embedded, during the driving of the nail therein, to thereafter firmly adhere thereto and adhesively secure substantially the full length of the shank therein upon subsequent hardening of the coat.

2. As an article of manufacture, a capped nail comprising a shank, a cap of relatively soft metal secured thereto, and a coat about said shank, said coat being dry at atmospheric temperatures and adapted to be softened to a tacky state by the heat developed between said coat and the material in which it is embedded during the driving of the nail therein, to thereafter firmly adhere thereto and adhesively secure the shank therein upon subsequent cooling of the coat.

3. As an article of manufacture, a nail, a cap thereon, and a film positioned between the cap and the nail, said film being dry at atmospheric temperatures but adapted to be transformed to a tacky state by the heat developed in hammering the cap as the assembly is driven into material to be fastened, thereby adhesively securing the cap to the nail.

4. As an article of manufacture, a roofing fastener comprising a screw shank, a relatively soft metal cap affixed thereon, and a film substantially covering said shank, said film being dry at atmospheric temperatures but adapted to be transformed to a tacky state by the heat developed in the rotation of the coated shank as it is driven into material to be fastened, the rotation of the coated shank serving to grind the cap into firmly sealed relation to the material engaged thereby, said film subsequently hardening and adhesively securing the fastener to the first mentioned material so as to positively prevent reverse creeping of the threaded shank.

5. As an article of manufacture, a roofing fastener comprising a metal cap, a shank of relatively hard material to which said cap is affixed, said shank having annular ledges facing said cap to positively interlock with the material into which the same is driven to prevent reverse creeping of said shank, and a film substantially covering said shank, said film being dry at atmospheric temperatures but adapted to be transformed to a tacky state by the heat developed in the driving of the coated shank into said material and consequent sealing of the cap against the material engaged thereby, said film subsequently hardening and adhesively securing the fastener to the first mentioned material so as to augment the prevention of reverse creeping of said shank.

6. As an article of manufacture, a capped nail comprising a shank, a cap of relatively soft metal secured thereto, and a coat about substantially the full length of said shank, said coat being dry at atmospheric temperatures and adapted to be softened to a tacky state by the heat developed between said coat and the material in which it is embedded during the driving of the nail therein, to thereafter firmly adhere thereto and adhesively secure the shank therein throughout substantially the full length of the shank upon subsequent cooling of the coat.

7. As an article of manufacture, a fastener comprising a cap of the type of lead adapted to flow upon application of fastening pressure, and a relatively stiff shank to which said cap is affixed, said shank having a cylindrical portion and one or more completely annular ledges facing said cap and of larger diameter than said cylindrical portion to positively interlock with the material into which the fastener is driven and thereby prevent reverse creeping of the shank.

8. As an article of manufacture, a fastener comprising a cap of the type of lead adapted to flow upon the application of fastening pressure to have sealing engagement with a member to be fastened, and a fastener element having a relatively stiff shank surmounted by a round head and one or more eccentric lugs projecting from said head and embedded in said cap so as to prevent turning of said cap, said shank having a cylindrical portion and one or more annular ledges completely surrounding the axis of the shank and facing said head and projecting radially outwardly beyond the surface of the cylindrical portion of the shank to interlock with the material into which the shank is embedded so as to prevent reverse creeping of the fastener and cooperate with said lug or lugs in maintaining the sealing engagement.

9. A nail comprising a metal shank of cylindrical form having at one end a driving tapering portion, said shank being upset in the form of one or more completely annular ledges at substantially right angles to the axis of the shank and facing away from said portion, each ledge terminating radially outwardly and radially inwardly beyond the normal surface of said shank, whereby, when imbedded in wood or the like, said ledge has substantial holding power without necessitating material weakening of the shank and without unduly increasing the resistance to driving, said nail having at its opposite end a head, and a relatively soft metal member of the type of lead about said head and having a depending central skirt surrounding the adjacent portion of the shank, whereby, when the nail is driven through sheet metal and imbedded in wood or the like, said member forms a substantially continuous annular seal in the hole and from the inner periphery to the outer periphery of the member said ledge interlocking with the wood to prevent breathing between the sheet metal and the wood, and thereby maintain the seal between the member and the sheet metal.

10. A nail comprising a metal shank of cylindrical form terminating in a driving tapering portion, said shank being upset in the form of completely annular ledges at substantially right angles to the axis of the shank and facing away from said tapering portion, said ledges terminating outward radially beyond the normal surface of said shank and inwardly adjacent said surface, said ledges being substantially spaced apart, whereby said ledges have substantial holding power without necessitating material weakening of the shank and without materially increasing the resistance to driving, said nail having at its opposite end a head, and a relatively soft metal member of the type of lead about said head and having a depending central skirt surrounding the adjacent portion of the shank, whereby, when the nail is driven through sheet metal and imbedded in wood or the like, said member forms a substantially continuous annular seal with the sheet metal from within the hole to the outer periphery of the member, said ledges interlocking with the wood to prevent creeping of the nail and thereby maintain the seal between the member and the sheet metal, the ledge nearest said tapering portion being spaced therefrom in the direction of the head of the nail by a cylindrical section of the shank.

11. As an article of manufacture, a nail adapted to secure sheet metal roofing to wood or the like, said nail comprising a cylindrical relatively stiff metal wire shank terminating at one end in a portion tapering to substantially a point adapted to cut a hole in the sheet metal when the nail is hammered thereinto, said shank terminating at its other end in a head, and a cap of relatively soft metal such as lead, flowable under hammer blows, encasing said head, said cap including a portion under said head and encasing the adjacent portion of said shank to have sealing engagement with the sheet metal throughout an uninterrupted annular area terminating inwardly within said hole, said shank having between said cap and said tapering portion a plurality of completely annular ledges upset from the material of said shank so as to project radially outwardly of the normal cylindrical surface of the wire and facing said cap to thereby interlock with the wood in which the shank is embedded so as to prevent breathing between the wood and the sheet metal, the ledge most remote from the head being located adjacent said tapering portion.

ROBERT KAPLAN.

DISCLAIMER 2,140,749.—*Robert Kaplan*, Chicago, Ill. CAPPED NAIL. Patent dated December 20, 1938. Disclaimer filed June 17, 1940, by the assignee, *Filshie Lead Head Nail Company*.

Hereby enters this disclaimer to claims 7, 9, 10, and 11 of said Letters Patent.
[*Official Gazette July 9, 1940.*]

subsequently hardening and adhesively securing the fastener to the first mentioned material so as to augment the prevention of reverse creeping of said shank.

6. As an article of manufacture, a capped nail comprising a shank, a cap of relatively soft metal secured thereto, and a coat about substantially the full length of said shank, said coat being dry at atmospheric temperatures and adapted to be softened to a tacky state by the heat developed between said coat and the material in which it is embedded during the driving of the nail therein, to thereafter firmly adhere thereto and adhesively secure the shank therein throughout substantially the full length of the shank upon subsequent cooling of the coat.

7. As an article of manufacture, a fastener comprising a cap of the type of lead adapted to flow upon application of fastening pressure, and a relatively stiff shank to which said cap is affixed, said shank having a cylindrical portion and one or more completely annular ledges facing said cap and of larger diameter than said cylindrical portion to positively interlock with the material into which the fastener is driven and thereby prevent reverse creeping of the shank.

8. As an article of manufacture, a fastener comprising a cap of the type of lead adapted to flow upon the application of fastening pressure to have sealing engagement with a member to be fastened, and a fastener element having a relatively stiff shank surmounted by a round head and one or more eccentric lugs projecting from said head and embedded in said cap so as to prevent turning of said cap, said shank having a cylindrical portion and one or more annular ledges completely surrounding the axis of the shank and facing said head and projecting radially outwardly beyond the surface of the cylindrical portion of the shank to interlock with the material into which the shank is embedded so as to prevent reverse creeping of the fastener and cooperate with said lug or lugs in maintaining the sealing engagement.

9. A nail comprising a metal shank of cylindrical form having at one end a driving tapering portion, said shank being upset in the form of one or more completely annular ledges at substantially right angles to the axis of the shank and facing away from said portion, each ledge terminating radially outwardly and radially inwardly beyond the normal surface of said shank, whereby, when imbedded in wood or the like, said ledge has substantial holding power without necessitating material weakening of the shank and without unduly increasing the resistance to driving, said nail having at its opposite end a head, and a relatively soft metal member of the type of lead about said head and having a depending central skirt surrounding the adjacent portion of the shank, whereby, when the nail is driven through sheet metal and imbedded in wood or the like, said member forms a substantially continuous annular seal in the hole and from the inner periphery to the outer periphery of the member said ledge interlocking with the wood to prevent breathing between the sheet metal and the wood, and thereby maintain the seal between the member and the sheet metal.

10. A nail comprising a metal shank of cylindrical form terminating in a driving tapering portion, said shank being upset in the form of completely annular ledges at substantially right angles to the axis of the shank and facing away from said tapering portion, said ledges terminating outward radially beyond the normal surface of said shank and inwardly adjacent said surface, said ledges being substantially spaced apart, whereby said ledges have substantial holding power without necessitating material weakening of the shank and without materially increasing the resistance to driving, said nail having at its opposite end a head, and a relatively soft metal member of the type of lead about said head and having a depending central skirt surrounding the adjacent portion of the shank, whereby, when the nail is driven through sheet metal and imbedded in wood or the like, said member forms a substantially continuous annular seal with the sheet metal from within the hole to the outer periphery of the member, said ledges interlocking with the wood to prevent creeping of the nail and thereby maintain the seal between the member and the sheet metal, the ledge nearest said tapering portion being spaced therefrom in the direction of the head of the nail by a cylindrical section of the shank.

11. As an article of manufacture, a nail adapted to secure sheet metal roofing to wood or the like, said nail comprising a cylindrical relatively stiff metal wire shank terminating at one end in a portion tapering to substantially a point adapted to cut a hole in the sheet metal when the nail is hammered thereinto, said shank terminating at its other end in a head, and a cap of relatively soft metal such as lead, flowable under hammer blows, encasing said head, said cap including a portion under said head and encasing the adjacent portion of said shank to have sealing engagement with the sheet metal throughout an uninterrupted annular area terminating inwardly within said hole, said shank having between said cap and said tapering portion a plurality of completely annular ledges upset from the material of said shank so as to project radially outwardly of the normal cylindrical surface of the wire and facing said cap to thereby interlock with the wood in which the shank is embedded so as to prevent breathing between the wood and the sheet metal, the ledge most remote from the head being located adjacent said tapering portion.

ROBERT KAPLAN.

DISCLAIMER 2,140,749.—*Robert Kaplan*, Chicago, Ill. CAPPED NAIL. Patent dated December 20, 1938. Disclaimer filed June 17, 1940, by the assignee, *Filshie Lead Head Nail Company*.

Hereby enters this disclaimer to claims 7, 9, 10, and 11 of said Letters Patent.

[*Official Gazette July 9, 1940.*]